United States Patent
Shin et al.

(10) Patent No.: US 8,213,889 B2
(45) Date of Patent: Jul. 3, 2012

(54) MULTI-CHANNEL RECEIVER AND METHOD OF REDUCING INTERFERENCE OF THE SAME

(75) Inventors: Seung Ho Shin, Seongnam-si (KR); Kyoo Hyun Lim, Yongin-si (KR); Chul Hoon Sung, Yongin-si (KR)

(73) Assignee: FCI Inc., Seongnam-Si (KR)

( * ) Notice: Subject to any disclaimer, the term of this patent is extended or adjusted under 35 U.S.C. 154(b) by 1085 days.

(21) Appl. No.: 12/119,181

(22) Filed: May 12, 2008

(65) Prior Publication Data

US 2008/0299902 A1 Dec. 4, 2008

(30) Foreign Application Priority Data

May 31, 2007 (KR) .................. 10-2007-0053004

(51) Int. Cl.
*H04B 1/10* (2006.01)
(52) U.S. Cl. ........................ 455/132; 455/313
(58) Field of Classification Search .............. 455/76, 455/550.1, 552.1, 553.1, 132, 134, 135, 137, 455/313, 314
See application file for complete search history.

(56) References Cited

U.S. PATENT DOCUMENTS

| | | | | |
|---|---|---|---|---|
| 5,896,562 | A | * | 4/1999 | Heinonen ................... 455/76 |
| 6,185,434 | B1 | * | 2/2001 | Hagstrom et al. ........ 455/552.1 |
| 7,260,416 | B2 | * | 8/2007 | Shippee .................... 455/552.1 |
| 2004/0248532 | A1 | * | 12/2004 | Khoini-Poorfard .......... 455/132 |

* cited by examiner

*Primary Examiner* — Thanh Le
(74) *Attorney, Agent, or Firm* — Kile Park Goekjian Reed & McManus PLLC

(57) ABSTRACT

A multi-channel receiver capable of minimizing an interference effect occurring among mounted receivers and a method of reducing interference of the multi-channel receiver capable of minimizing the interference effect occurring among the mounted receivers are provided. The multi-channel receiver includes an antenna, a first receiver, and a second receiver. The antenna receives an RF signal in a predetermined frequency band. The first receiver down-converts the RF signal received through the antenna into a first IF signal. The second receiver down-converts the RF signal received through the antenna into a second IF signal. Here, the first and second receivers down-convert the RF signal by exclusively using a local oscillation frequency signal generated by using a low side LO injection method or a local oscillation frequency signal generated by using a high side LO injection method.

4 Claims, 2 Drawing Sheets

MULTI-CHANNEL RECEIVER AND METHOD OF REDUCING INTERFERENCE OF THE SAME

BACKGROUND OF THE INVENTION

1. Field of the Invention

The present invention relates to a multi-channel receiver, and more particularly to a multi-channel receiver capable of minimizing interference effects among receivers.

2. Description of the Related Art

A terrestrial digital multimedia broadcasting (DMB) receiver, a mobile TV receiver, and the like generally use a low intermediate frequency (hereinafter, referred to as low-IF) band. A receiver that uses the low-IF band down-converts a radio frequency (hereinafter, referred to as RF) signal received through an antenna into a low-IF signal of which frequency is relatively lower than that of the RF signal and uses the low-IF signal. In general, the RF signal is down-converted by a down-conversion mixer.

Recently, a function of receiving terrestrial DMB signals and a function of mobile TV signals are included in a navigator or mobile phone. A service for providing various data is provided by mounting a multi-channel receiver including at least two receivers on the navigator or mobile phone.

FIG. 1 is a schematic view illustrating a multi-channel receiver.

Referring to FIG. 1, in a multi-channel receiver 10, two receivers 11 and 12 convert an RF signal received through a common antenna 20 into first and second IF signals IF1 and IF2, respectively.

The common antenna 20 receives signals in a predetermined frequency band. There are a plurality of channel signals that use frequency bands obtained by dividing the entire frequency band. Since channels exclusively use the divided frequency bands, there is no problem in a case where the two receivers 11 and 12 respectively receive signals of different channels. However, when the two receivers 11 and 12 receive signals of the same channel, frequencies of local oscillation frequency signals (not shown) supplied to the first and second receivers 11 and 12 are the same. In this case, a voltage controlled oscillator (not shown) for supplying local oscillation frequency signals to the first and second receivers 11 and 12 and a frequency synthesizer (not shown) generate signals with the same frequency. Although the frequencies of the signals are the same, phases of the signals may be different from each other. Accordingly, an interference effect between the first and second receivers 11 and 12 is amplified, thereby deteriorating performance of the multi-channel receiver.

SUMMARY OF THE INVENTION

The present invention provides a multi-channel receiver capable of minimizing an interference effect occurring among mounted receivers.

The present invention also provides a method of reducing interference of a multi-channel receiver capable of minimizing an interference effect occurring among mounted receivers.

According to an aspect of the present invention, there is provided a multi-channel receiver including an antenna, a first receiver, and a second receiver. The antenna receives an RF signal in a predetermined frequency band. The first receiver down-converts the RF signal received through the antenna into a first IF signal. The second receiver down-converts the RF signal received through the antenna into a second IF signal. Here, the first and second receivers down-convert the RF signal by exclusively using a local oscillation frequency signal generated by using a low side LO injection method or a local oscillation frequency signal generated by using a high side LO injection method.

According to another aspect of the present invention, there is provided a method of reducing interference of a multi-channel receiver capable of minimizing an interference effect among at least two receivers for concurrently down-converting signals of the same channel into intermediate frequency (IF) signals, the method comprising: generating a local oscillation frequency signal by using a low side LO injection method; generating a local oscillation frequency signal by using a high side LO injection method; down-converting an RF signal into an IF signal by using the local oscillation frequency signal generated by using the low side LO injection method; and down-converting an RF signal into an IF signal by using the local oscillation frequency signal generated by using the high side LO injection method. Here, one of the at least two receivers for concurrently down-converting the signals of the same channel into the IF signals down-converts a signal by using the local oscillation frequency signal generated by using the low side LO injection method, and the other receiver down-converts a signal by using the local oscillation frequency signal generated by using the high side LO injection method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
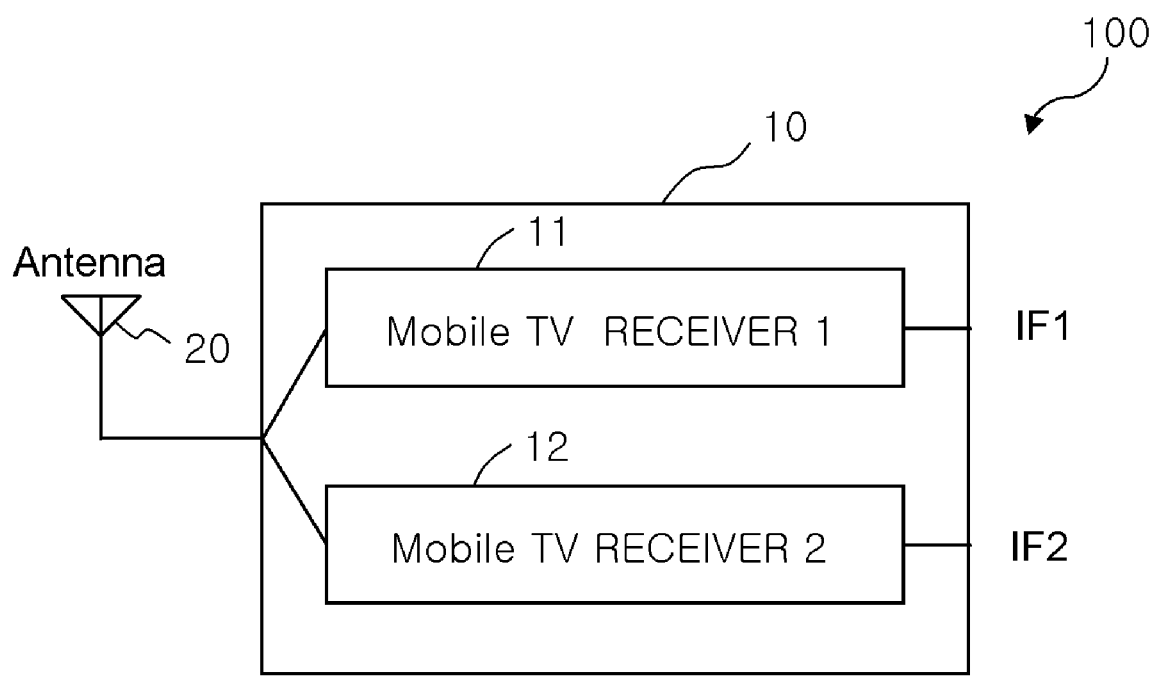
FIG. 1 is a schematic view illustrating a multi-channel receiver.
Figure 2:
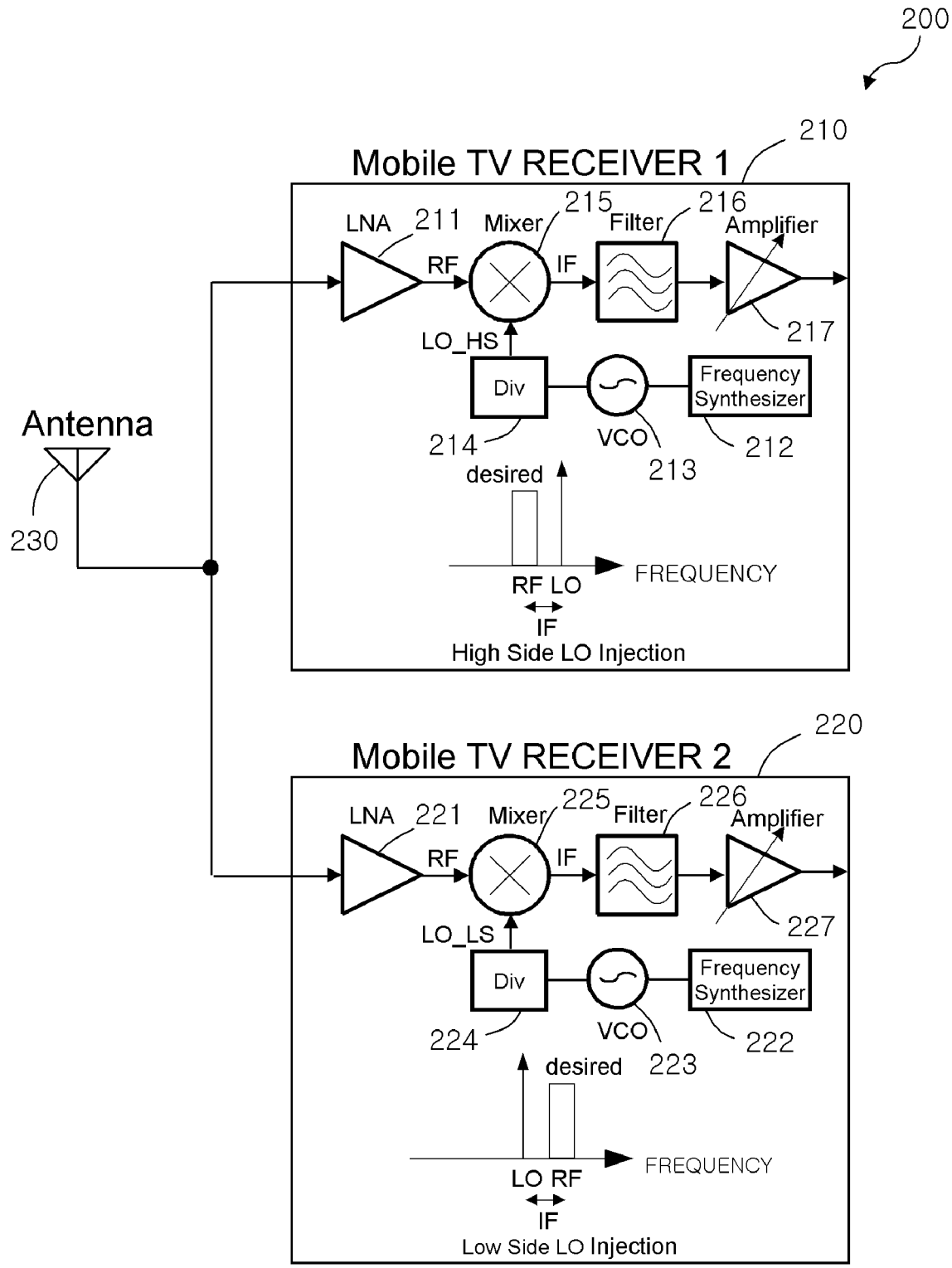
FIG. 2 is a block diagram illustrating a multi-channel receiver according to an embodiment of the present invention.

FIG. 2 is a block diagram illustrating a multi-channel receiver according to an embodiment of the present invention.

Referring to FIG. 2, a multi-channel receiver 200 includes two receivers 210 and 220.

A first receiver 210 includes a low noise amplifier (LNA) 211, a frequency synthesizer 212, a voltage controlled oscillator 213, a frequency divider 214, a mixer 215, a filter 216, and an amplifier 217.

The LNA 211 amplifies a channel signal received through an antenna 230. The frequency synthesizer 212 generates a frequency controlled voltage corresponding to a signal with a predetermined frequency. The voltage controlled oscillator 213 generates an oscillation signal with a frequency corresponding to the frequency controlled voltage. The frequency divider 214 generates a high side local oscillation frequency signal LO_HS by using the oscillation signal generated by the voltage controlled oscillator 213. Here, a frequency $f_{LO\_HS}$ the high side local oscillation frequency signal LO_HS is obtained by adding a frequency $f_{RF}$ of a radio frequency signal to a frequency $f_{IF}$ of an intermediate frequency signal as shown in Equation 1.

$$f_{LO\_HS} = f_{RF} + f_{IF} \quad \text{[Equation 1]}$$

It is possible to easily understand Equation 1 from a relation between a local oscillation frequency signal LO and a radio frequency signal RF in the first receiver 210. The mixer 215 down-converts a radio frequency signal RF that is output from the LNA 211 into an intermediate frequency signal by using the high side local oscillation frequency signal LO_HS received from the frequency divider 214. This is referred to as a high side LO injection. The filter 216 selects only a real number component from the intermediate frequency signal that is output from the mixer 215. The amplifier 217 improves a driving capability of a signal that is output from the filter 216.

Since a structure of a second receiver 220 is the same as that of the first receiver 210, description on the structure of the second receiver 220 will be omitted. Unlike the mixer 215 of the first receiver 210, a mixer 225 of the second receiver 220 down-converts a radio frequency signal that is output from a LAN 221 into an intermediate frequency signal by using a low side local oscillation frequency signal LO_LS generated by a frequency divider 224.

Here, a frequency $f_{LO\_LS}$ of the low side local oscillation frequency signal LO_LS is obtained by subtracting a frequency $f_{IF}$ of an intermediate frequency signal from a frequency $f_{RF}$ of a radio frequency signal as shown in Equation 2.

$$f_{LO\_LS} = f_{RF} - f_{IF} \quad \text{[Equation 1]}$$

It is possible to easily understand Equation 2 from a relation between a local oscillation frequency signal LO and a radio frequency signal RF in the second receiver 220. This is referred to a low side LO injection.

In the present invention, when the two receivers 210 and 220 process signals of the same channel, although the used intermediate frequencies of the signals are the same, a receiver 210 uses a low side local oscillation signal LO_LS, and the other receiver 220 uses a high side local oscillation signal LO_HS.

As described above, since the frequency of the low side local oscillation frequency signal LO_LS is different from that of the high side local oscillation frequency signal LO_HS within an allowable range, an interference effect does not occur when processing signals of the same channel.

As described above, in the multi-channel receiver and the method of reducing interference of the multi-channel receiver, it is possible to minimize an interference effect occurring when at least two receivers process signals of the same channel.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A multi-channel receiver comprising:
an antenna receiving a radio frequency (RF) signal in a predetermined frequency band;
a first receiver down-converting the RF signal received through the antenna into a first intermediate frequency (IF) signal; and
a second receiver down-converting the RF signal received through the antenna into a second IF signal,
wherein when the first and second receivers are to process signals of the same channel, the first and second receivers down-convert the RF signal into the first and second IF signals by using local oscillation frequency signals with different frequencies within an allowable range,
wherein the different frequencies are generated by respectively applying a low side LO injection method and a high side LO injection method.

2. The multi-channel receiver of claim 1,
wherein the frequency obtained by applying the low side LO injection method is obtained by subtracting a frequency of the first IF signal from a frequency of the RF signal, and
wherein the frequency obtained by applying the high side LO injection method is obtained by adding a frequency of the second IF signal to the frequency of the RF signal.

3. A method of reducing interference of a multi-channel receiver capable of minimizing an interference effect among at least two receivers for concurrently down-converting signals of the same channel into IF signals, the method comprising:
generating different local oscillation frequency signals within an allowable range; and
down-converting RF signals into IF signals by allowing one of the at least two receivers to use one of the different local oscillation frequency signals and allowing the other receiver to use the other of the different local oscillation frequency signals,
wherein the generating of the different local oscillation frequency signals includes:
generating a local oscillation frequency signal by using a low side LO injection method; and
generating a local oscillation frequency signal by using a high side LO injection method.

4. A method of reducing interference of a multi-channel receiver capable of minimizing an interference effect among at least two receivers for concurrently down-converting signals of the same channel into intermediate frequency (IF) signals, the method comprising:
generating a local oscillation frequency signal by using a low side LO injection method;
generating a local oscillation frequency signal by using a high side LO injection method;
down-converting an RF signal into an IF signal by using the local oscillation frequency signal generated by using the low side LO injection method; and
down-converting an RF signal into an IF signal by using the local oscillation frequency signal generated by using the high side LO injection method,
wherein one of the at least two receivers for concurrently down-converting the signals of the same channel into the IF signals down-converts a signal by using the local oscillation frequency signal generated by using the low side LO injection method, and the other receiver down-converts a signal by using the local oscillation frequency signal generated by using the high side LO injection method.

* * * * *